(12) United States Patent
Bulut et al.

(10) Patent No.: US 11,074,043 B2
(45) Date of Patent: Jul. 27, 2021

(54) AUTOMATED SCRIPT REVIEW UTILIZING CROWDSOURCED INPUTS

(71) Applicant: INTERNATIONAL BUSINESS MACHINES CORPORATION, Armonk, NY (US)

(72) Inventors: Muhammed Fatih Bulut, Ossining, NY (US); Anup Kalia, Elmsford, NY (US); Maja Vukovic, New York, NY (US); Raghav Batta, Ossining, NY (US); Jinho Hwang, Ossining, NY (US); Jin Xiao, White Plains, NY (US); Rohit Madhukar Khandekar, Jersey city, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 38 days.

(21) Appl. No.: 16/515,358

(22) Filed: Jul. 18, 2019

(65) Prior Publication Data
US 2021/0019120 A1    Jan. 21, 2021

(51) Int. Cl.
*G06F 8/20* (2018.01)
*G06F 8/75* (2018.01)

(52) U.S. Cl.
CPC . *G06F 8/20* (2013.01); *G06F 8/75* (2013.01)

(58) Field of Classification Search
CPC ................................. G06F 8/20; G06F 8/751
See application file for complete search history.

(56) References Cited

U.S. PATENT DOCUMENTS

| 2007/0239993 | A1* | 10/2007 | Sokolsky .............. G06F 21/563 713/188 |
| 2008/0295085 | A1 | 11/2008 | Rachamadugu et al. |
| 2010/0242028 | A1 | 9/2010 | Weigert |
| 2014/0196010 | A1 | 7/2014 | Balachandran |

(Continued)

OTHER PUBLICATIONS

Georgi M. Kanchev et al., Canary: Extracting Requirements-Related information from Online Discussions, IEEE 2017, retrieved online on Mar. 10, 2021, pp. 31-40. Retrieved from the Internet: <URL: https://ieeexplore.ieee.org/stamp/stamp.jsp?tp=&arnumber=8048888>. (Year: 2017).*

*Primary Examiner* — Hanh Thi-Minh Bui
(74) *Attorney, Agent, or Firm* — Cantor Colburn LLP; Abdy Raissinia

(57) ABSTRACT

Methods, systems and computer program products for providing automated script review utilizing crowdsourced inputs are provided. Aspects include receiving a new script including a script text and a script description. Aspects include comparing the new script to each of a plurality of previously classified scripts to determine a degree of similarity. Each of the previously classified scripts and the new script have an associated set of attributes. Responsive to determining that the degree of similarity is below a predetermined threshold, aspects include mapping the new script to a crowdsourcing platform to identify a similar script. Aspects also include receiving information indicative of one or more features from the crowdsourcing platform. Responsive to inputting the one or more features into an acceptance model, aspects include generating an acceptance recommendation associated with the new script.

17 Claims, 6 Drawing Sheets

(56) References Cited

U.S. PATENT DOCUMENTS

| | | | |
|---|---|---|---|
| 2015/0074033 A1 | 3/2015 | Shah | |
| 2015/0169292 A1* | 6/2015 | Shimada | G06F 8/30 |
| | | | 717/115 |
| 2015/0378687 A1 | 12/2015 | Malnati et al. | |
| 2016/0232474 A1* | 8/2016 | Zou | G06Q 10/063112 |
| 2016/0266896 A1 | 9/2016 | Fan et al. | |
| 2017/0075790 A1 | 3/2017 | Macleod et al. | |
| 2017/0357486 A1* | 12/2017 | DeLuca | G06F 8/30 |
| 2018/0113801 A1 | 4/2018 | Fletcher et al. | |
| 2020/0019389 A1* | 1/2020 | Durvasula | G06F 8/36 |

* cited by examiner

AUTOMATED SCRIPT REVIEW UTILIZING CROWDSOURCED INPUTS

BACKGROUND

The present invention generally relates to programmable computing systems, and more specifically, to computing systems, computer-implemented methods, and computer program products configured to provide automated script review utilizing crowdsourced inputs.

A script is a software program or sequence of instructions that can be executed by another program to carry out some functionality. During software or product development, the need for new scripts emerges frequently in areas such as traditional infrastructure automation and DevOps automation. After a new script is created by a developer, many organizations will submit the new script to a review process in order to assess the acceptability of the script in terms of various factors such as whether the script performs the intended function, the impact of the script on the applicable systems, security concerns raised by the script, and other such factors. This review process can be lengthy and is generally performed by subject matter experts that may have limited availability to perform such reviews.

SUMMARY

Embodiments of the present invention are directed to a computer-implemented method for providing automated script review utilizing crowdsourced inputs. A non-limiting example of the computer-implemented method includes receiving a new script including a script text and a script description. The new script is compared to each of a plurality of previously classified scripts to determine a degree of similarity. Each of the plurality of previously classified scripts and the new script have an associated set of attributes. Responsive to determining that the degree of similarity is below a predetermined threshold, the new script is mapped to a crowdsourcing platform to identify a similar script. Information indicative of one or more features from the crowdsourcing platform is received. Responsive to inputting the one or more features into an acceptance model, an acceptance recommendation associated with the new script is generated.

Embodiments of the present invention are directed to a system for providing automated script review utilizing crowdsourced inputs. The system includes a memory having computer readable computer instructions, and a processor for executing the computer readable instructions. The computer readable instructions also include instructions for receiving a new script including a script text and a script description. The new script is compared to each of a plurality of previously classified scripts to determine a degree of similarity. Each of the plurality of previously classified scripts and the new script have an associated set of attributes. Responsive to determining that the degree of similarity is below a predetermined threshold, the new script is mapped to a crowdsourcing platform to identify a similar script. Information indicative of one or more features from the crowdsourcing platform is received. Responsive to inputting the one or more features into an acceptance model, an acceptance recommendation associated with the new script is generated.

Embodiments of the invention are directed to a computer program product for providing automated script review utilizing crowdsourced inputs, the computer program product comprising a computer readable storage medium having program instructions embodied therewith. The program instructions are executable by a processor to cause the processor to perform a method. A non-limiting example of the method includes receiving a new script including a script text and a script description. The new script is compared to each of a plurality of previously classified scripts to determine a degree of similarity. Each of the plurality of previously classified scripts and the new script have an associated set of attributes. Responsive to determining that the degree of similarity is below a predetermined threshold, the new script is mapped to a crowdsourcing platform to identify a similar script. Information indicative of one or more features from the crowdsourcing platform is received. Responsive to inputting the one or more features into an acceptance model, an acceptance recommendation associated with the new script is generated.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
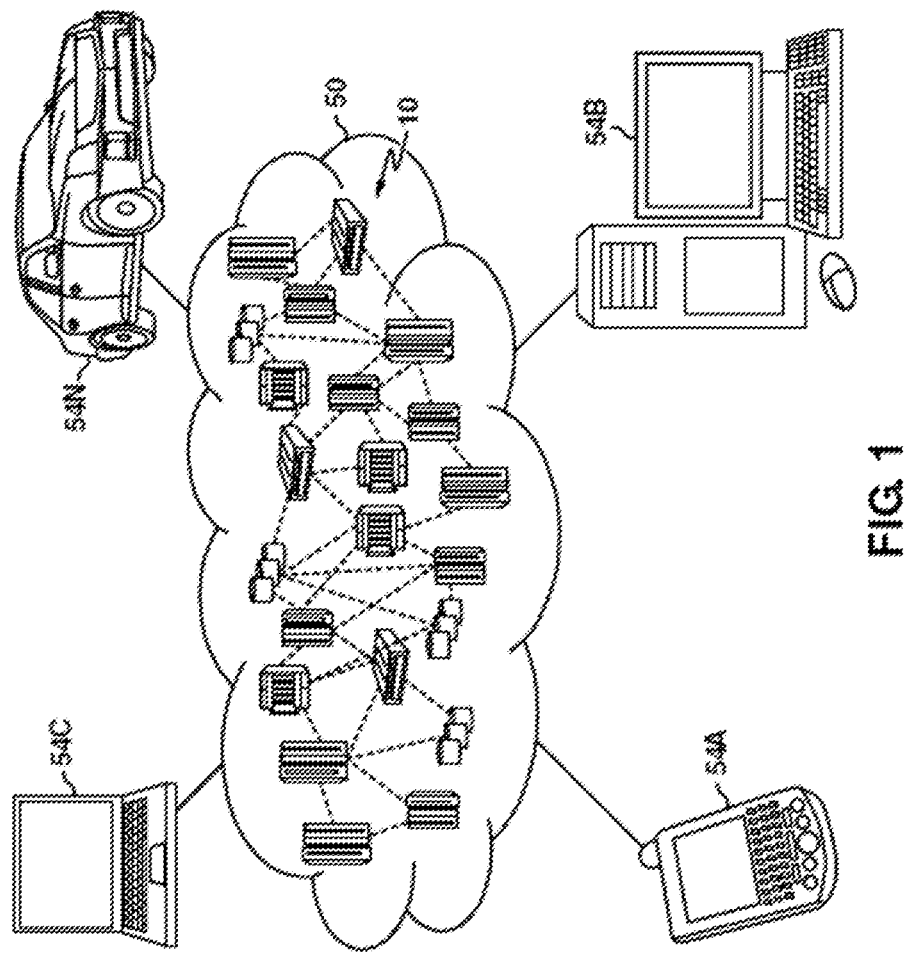
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
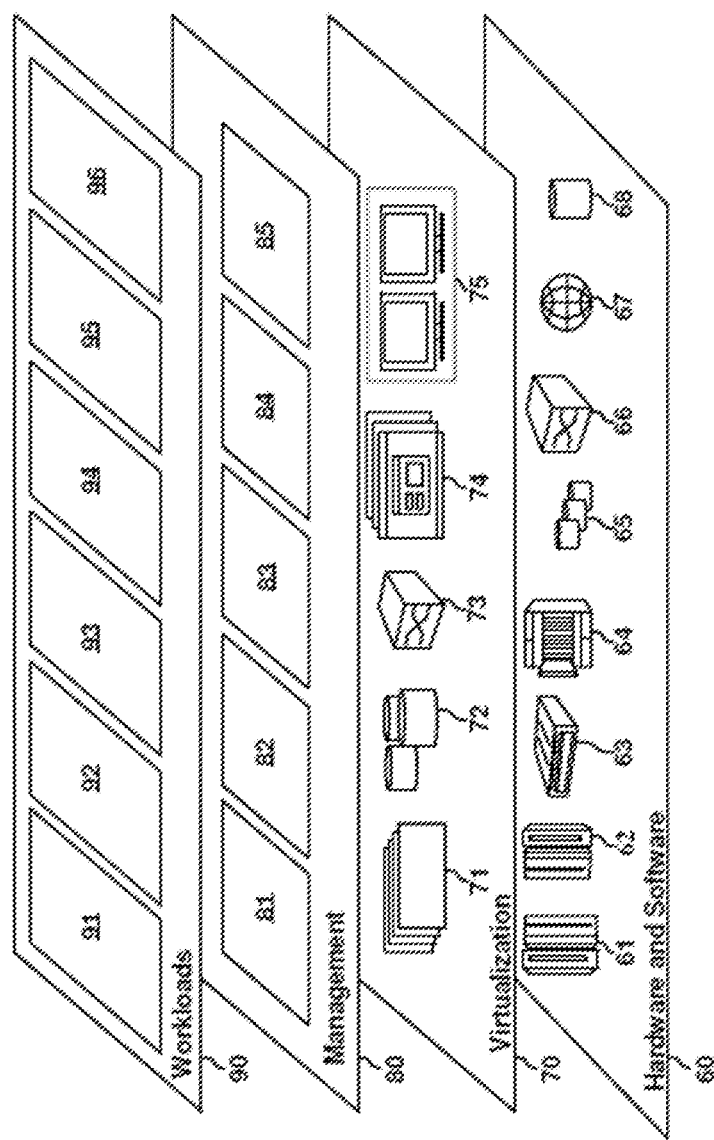
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments of the invention, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing automated script review utilizing crowdsourced inputs 96.

Figure 3:
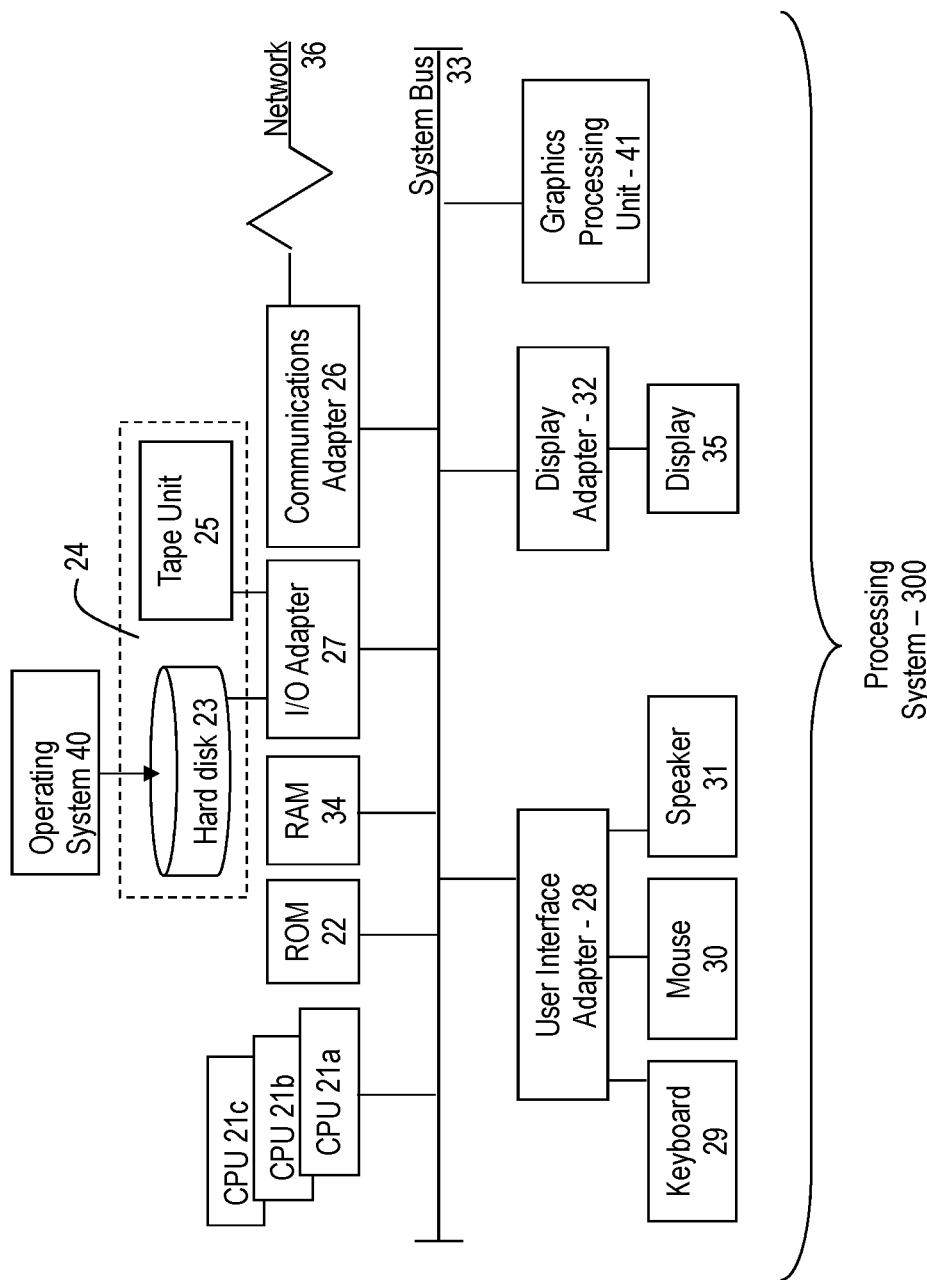
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments of the invention, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments of the invention, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, a software script is a software program or sequence of instructions that can be executed by another program to carry out some functionality. Newly developed scripts will commonly be subjected to an organizational review process to ensure that the new script performs as intended, does not negatively impact other components of a system, does not create security issues, and otherwise meets an organization's review criteria. Such a review process is generally performed by subject matter experts with limited time and availability, which can lead to slower turnaround time. Further, such reviews can be lengthy and tedious, which may result in errors. Further, different scripts may require review by subject matter experts of different fields of expertise, which means scripts must be assigned to the proper individuals for review. These various problems with the traditional approach to reviewing scripts can result in the process taking a very long time and may lead to errors or omissions in proper review and approval of scripts.

Turning now to an overview of the aspects of the invention, one or more embodiments of the invention address the above-described shortcomings of the prior art by providing automated script review utilizing crowdsourced inputs. This novel approach can significantly expedite the script review process and improve the quality of script acceptance/rejection determinations by leveraging crowdsourced script feedback in conjunction with an acceptance/rejection model that can automatically generate an acceptance or rejection recommendation.

The above-described aspects of the invention address the shortcomings of the prior art by determining whether a matching script has previously been classified by review, and if not, the script can be mapped to a crowdsourcing platform, such as a website forum that is accessible by a number of users that may have individual insights about the new script, which can be used to generate features used in an script acceptance model. The invention can eliminate review bottlenecks caused by a lack of availability of appropriate subject matter experts and can generate more accurate acceptance/rejection recommendations by collecting and incorporating crowdsourced knowledge into acceptance modeling. The invention can also generate increased security and compliance by introducing community driven insights into the review process.

Figure 4:
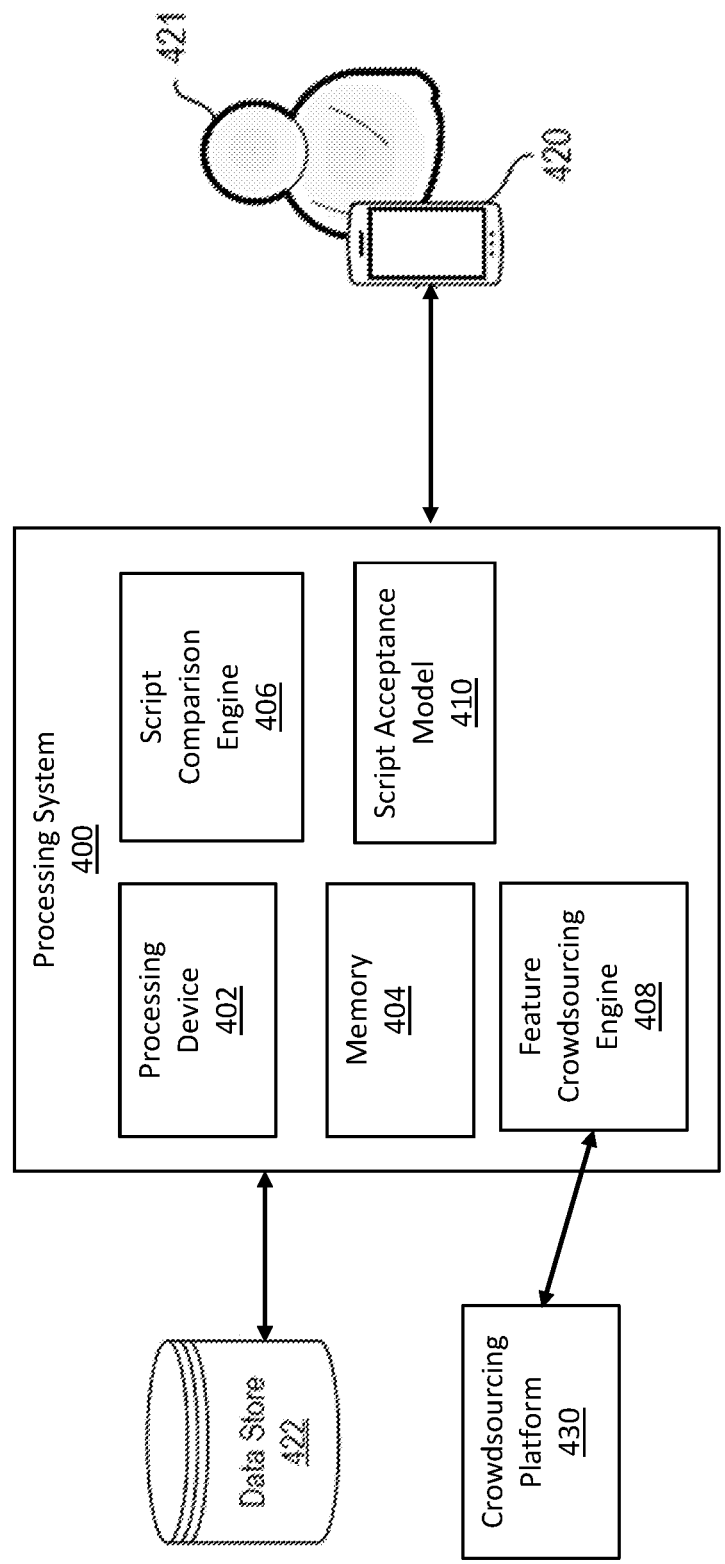
FIG. 4 depicts a system for providing automated script review utilizing crowdsourced inputs according to one or more embodiments of the present invention.

Turning now to a more detailed description of aspects of the present invention, FIG. 4 depicts a block diagram of a processing system 400 for providing automated script review utilizing crowdsourced inputs, according to aspects of the present disclosure. The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

The processing system 400 includes the processing device 402, the memory 404, a script comparison engine 406, a feature crowdsourcing engine 408 and a script acceptance model 410. According to some embodiments, processing system 400 may include some or all of the elements of processing system 300 shown in FIG. 3. In some embodiments, elements of processing system 400 may be embodied in computer elements located within a network that may reside in the cloud, such as the cloud computing environment 50 described herein above and illustrated in FIGS. 1 and 2. The processing system 400 can be configured to communicate with a user 421 via user device 420, which can output text, images, videos, and/or sounds to the user 421 and receive commands (e.g., via tactile inputs, voice commands, or other such inputs) or other user inputs from the user 421. According to some embodiments, the processing system 400 may communicate with user device 420, data store 422 and/or crowdsourcing platform 430 via communications network that may be one or more of, or a combination of, public (e.g., Internet), private (e.g., local area network, wide area network, virtual private network), and may include wireless and wireline transmission systems (e.g., satellite, cellular network, terrestrial networks, etc.). In exemplary embodiments, user device 420 can include any device upon which a user 421 (e.g., a software developer) may generate a new script (i.e., script code) and associated script description. User device 420 can include, but is not limited to, a desktop computer, a laptop computer, a smartphone, a wearable device such as a smartwatch, an augmented reality headset, a tablet, and a smart speaker. The processing system 400 may store and access data, such as stored scripts, via a connected data store 422.

According to some embodiments, script comparison engine 406 can be configured to compare a new script (e.g., received from user device 420) to one or more previously classified scripts to determine if a matching script exists. According to some embodiments, data store 422 or other memory on processing system 400 may store a plurality of previously classified scripts. The previously classified scripts may be stored in a knowledge base associated with an organization that represents the organization's internal knowledge. For example, each time a script is reviewed and accepted or rejected by a subject matter expert, the script may be classified and stored in the knowledge base for use in future comparisons. Each script may include a script text (which may also be referred to as the script code) and a script description. The script text is software code that performs the intended function of the script when executed, whereas the script description can be a short written description of the intended function of the script. For example, a script text may be "sudo iptables -I INPUT 1 -i lo -j REJECT" and the associated script description may be "Prepend a given rule to the iptables". Previously classified scripts may include an indication of whether the scripts were previously accepted or rejected by a review process. Each of the previously classified scripts and the new script may also be associated with a set of attributes that can include one or more of an indication of an associated product (e.g., Linux) of the respective script, an indication of a type of action performed by the respective script (e.g., "prepend data"), one or more parameters (e.g., specified number of inputs and/or outputs) associated with respective script and the language the respective script is written in (e.g., "Java"). The characterization of each script by one or more of these attribute types may be used in comparison of one script to another to identify matching scripts. According to some embodiments of the invention, one script may be said to match another script if there is an exact match of attributes. According to some embodiments, a script may be considered to match another script if a degree of similarity between the two scripts exceeds a predetermined threshold degree of similarity. As will be understood by those of skill in the art, many different algorithms or predetermined threshold could be used to define a comparison of two scripts that results in a match. For example, in various embodiments, comparisons may include comparisons of the script texts, comparisons of the script descriptions, comparisons of one or more corresponding attributes of each set of attributes associated with the scripts, or various combinations of the aforementioned aspects. In some embodiments of the invention, certain aspects associated with each script must match exactly in order for the comparison to be considered a match. For example, if two script codes are identical, but have attributes that indicate that each is written in a different language, then the scripts may be determined to not be matching due to the fact that they are coded in different languages. According to some embodiments of the invention, if a matching script is found, features of the new script and matching script may be input into the acceptance model to generate a recommendation as to whether the new script should be accepted or rejected. According to some embodiments, features can include one or more of, but are not limited to, similarity of text descriptions, similarity of code text, whether a script was accepted or not, positive and/or negative counts of sentiments associated with a script, number of upvotes and/or downvotes, and other such features. As will be understood, it can be useful to utilize the acceptance model in the case of a matching script to determine an acceptance recommendation as opposed to merely copying the acceptance/rejection of the matching script because a "matching script" may not necessarily be an exact match, and over time a given script that may have been accepted before may no longer be acceptable and such changes can be captured by the acceptance model. If the script comparison engine 406 determines that there is no previously classified script that matches the new script (e.g., no previously classified script has a degree of similarity to the new script that is above the predetermined threshold), then the feature crowdsourcing engine 408 may attempt to seek insights about the new script using crowdsourcing as described below.

The feature crowdsourcing engine 408 can be configured to map the new script to the crowdsourcing platform 430 to identify a similar script. According to some embodiments of the invention, the crowdsourcing platform 430 may include a website or online forum that is accessible by various users to allow the users to provide input on a proposed script. The crowdsourcing platform 430 may be publically accessible (e.g., via the Internet) or may be an internal platform that is only accessible by authorized users. According to some embodiments, the crowdsourcing platform 430 may be a question and answer website, such as Server Fault™, Stack Overflow™, or any other similar type of question and answer web site or forum. In some embodiments of the invention, a script text and/or script description can be posted on a webpage, which may be viewed and commented upon by one or more users of the crowdsourcing platform. The crowdsourcing platform 430 may be configured to allow users to submit comments, proposed alternative script texts and script descriptions, and can allow users to vote on one or more script texts. As will be understood by those of skill in the art, an "upvote" is an indication of approval/agreement with an associated item whereas a "downvote" is an indication of disapproval/disagreement. Feature crowdsourcing engine 408 can be configured to determine whether the sentiment of each comment is positive, negative or neutral by using one or more tone detection tools, such as for example, IBM's Tone Analyzer™, which can determine emotion (e.g., anger, disgust, fear joy and sadness), social propensities (openness, conscientiousness, extroversion, agreeableness, and emotional range), and language styles (analytical, confident and tentative). Feature crowdsourcing engine 408 can be configured to count the total/net number of upvotes and downvotes associated with a posted script determine an aggregated sentiment associated with a posted script by, for example, determining the average sentiment of the comments associated with the posted script.

In some embodiments of the invention, crowdsourcing platform 430 may generate a post with a proposed script and a description of the proposed script in association with a request to solicit opinions from the users of the crowdsourcing platform. For example, the crowdsourcing platform may post a proposed script text of "sudo iptables -I INPUT 1 -i lo -j REJECT" and associated script description of "Prepend a given rule to the iptables" with a request soliciting users thoughts and opinions about whether the proposed script will appropriately accomplish the described task. The crowdsourcing platform 430 can receive comments and votes on the proposed script that represent various users' opinions on whether the proposed script is suitable for its intended purpose. A user may post one or more suggested alternative scripts (e.g., a different script for prepending rules to an iptable), which may also receive associated comments and votes. According to some embodiments of the invention, feature crowdsourcing engine 408 may identify a particular posted suggested alternative script as the most similar script to that of the new script by determining which of the one or more suggested alternative scripts has the highest number of upvotes, highest net number of upvotes, most positive average sentiment of comments, or some combination of these or other such metrics.

According to some embodiments of the invention, the feature crowdsourcing engine 408 may map the new script to the crowdsourcing platform 430 by causing the crowdsourcing platform to post to a currently existing page or generate a new page (e.g., webpage) that includes the new script as a proposed script associated with a request for user comments and feedback. In some embodiments of the invention, the feature crowdsourcing engine 408 may map the new script to crowdsourcing platform 430 by identifying a previously existing webpage that includes a proposed script that is above a threshold level of similarity to the new script. According to some embodiments of the invention, the feature crowdsourcing engine 408 may be configured to receive information indicative of one or more features. In some embodiments of the invention, such information can be information that is associated with proposed script on a previously existing webpage that is above a threshold level of similarity to the new script or can be information that is associated with a suggested alternative script that was posted in response to the creation of a new page that includes the new script as a proposed script. Thus, if a previous discussion on the crowdsourcing platform 430 relates to a substantially similar script as the new script, then feature crowdsourcing engine 408 may pull information associated with the previously discussed script, however if there are no previously discussed scripts that are similar enough or that have enough associated user-input information (e.g., comments, votes, etc.), then feature crowdsourcing engine 408 may cause crowdsourcing platform 430 to generate a new page with the new script and solicit responses and information about potential alterative scripts. In some embodiments of the invention, feature crowdsourcing engine 408 may be configured to leave a post up for a predetermined amount of time before retrieving information indicative of one or more features. For example, feature crowdsourcing engine 408 may wait two days until after a new page with the new script is generated to allow time for a sufficient number of users to provide commentary. Alternatively, feature crowdsourcing engine 408 may be configured to wait for a minimum number of votes, comments or page views before retrieving such information.

According to some embodiments of the invention, information indicative of one or more features can be for example, a text of a similar script, a description of a similar script, a number of upvotes associated with a similar script, a number of downvotes associated with a similar script, a number of positive sentiments associated with a similar script, a number of neutral sentiments associated with a similar script, a number of negative sentiments associated with a similar script, and an indication of whether the similar script was previously accepted or rejected (e.g., as indicated by responses on the website). Feature crowdsourcing engine 408 may determine one or more features based on the information indicative of one or more features. According to some embodiments of the invention, one or more features may include one or more of: a level of similarity between descriptions of the new script and the similar script, a level of similarity between the script text of the new script and the text of the similar script, an indication of whether the similar script was previously accepted or rejected, a number of upvotes, a percentage of upvotes, a number of positive sentiments and a percentage of positive sentiments.

According to some embodiments, the script acceptance model 410 can be configured to output an acceptance or rejection recommendation for a new script in response to receiving one or more features based on the new script and a similar script (e.g., a suggested script posted on the crowdsourcing platform in response to a post about the new script that a high amount of upvotes and positive sentiments). According to some embodiments of the invention, the script acceptance model 410 may be a trained machine learning model that is trained to generate an acceptance recommendation in response to receiving a feature vector. As will be understood by those of skill in the art, the script acceptance model 410 may be trained using supervised learning based on a training set of data that includes features from comparisons of previous scripts with known acceptance/rejection classifications. For example, in some embodiments of the invention, the script acceptance model 410 may be trained by taking as input previously submitted description and script pairs {Di, Si} and their associated labels Li {0,1}, where Di represents the script description and Si represents the script text, and a label of "0" indicates rejection of the script and a label of "1" represents an acceptance of the script. Then, for i from 1 to N, a matching script (as previously described above) for the previously submitted description and script pair may be looked up in the data store 422. The data store 422 may not include all information about every feature (e.g., it may not include upvotes and sentiment information for previously classified scripts that were not generated using crowdsourcing), but as will be understood by those of skill in the art, the acceptance model can be trained while missing some information or trained labeling missing information as unknown, but overtime the acceptance model will accumulate such information if it does not initially exist. A matching script may be represented as {Dj, Sj, Pj, Vj, Nj, Aj}, where Dj represents the description of the matching script, Sj represents the script text of the matching script, Pj represents a number of positive sentiments associated with the matching script, Vj may represent the number of upvotes associated with the matching script, Nj may represent the number of negative sentiments associated with the matching script, and Aj may represent the accepted or not accepted status {0,1} of the matching script. A text similarity between the script description of the new script and of the matching script may be calculated as Ti,j, and likewise a code similarity score representative of the similarity between the script text of the new script and of the matching script may be calculated as Ci,j. According to some embodiments, text similarity may be calculated as Cosine similarity. The calculated features, $\{T_{i,j}, C_{i,j}, Pj, Vj, Nj, Aj\}$ can be stored as a feature vector in list X and Li can be stored in Y and the model may be trained using X as input and Y as output. According to some embodiments, script acceptance model 410 may be a support-vector machine (SVM) supervised learning model, a neural network, a decision tree, or any other type of model that can be used to determine an acceptance/rejection recommendation based on the input features. Once trained, the script acceptance model 410 may receive a feature vector derived based on the new script and information about a matching or similar script, as identified from the data store 422 or crowdsourcing platform 430 respectively, and output a recommendation indicating whether the new script should be accepted or rejected.

According to some embodiments, the script acceptance model 410 may be improved over time by making predictions, receiving feedback from a human reviewer regarding whether the prediction was correct, and retraining the model. For example, a labeled set of training data $D_1$ can be used to train a multi class classifier $f_1$ that is used to predict labels for a given input script S based on information indicative of one or more features, such as votes and sentiments. User feedback can then be received to validate that the script S worked or not and the training data Di can be updated with the script S and its appropriate label (i.e., accepted or not accepted). The multi-label classifier $f_1$ can then be retrained using the updated training data Di.

Figure 5:
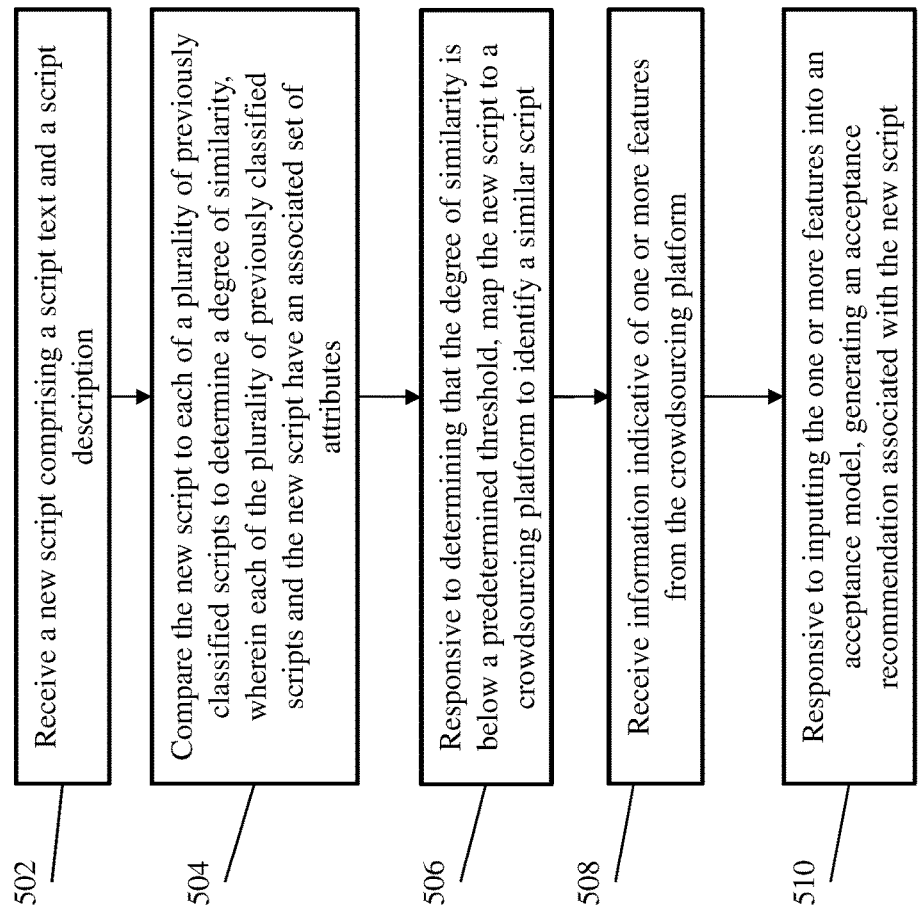
FIG. 5 depicts a flow diagram of a method for providing automated script review utilizing crowdsourced inputs according to one or more embodiments of the invention.

Turning now to FIG. 5, a flow diagram of a method 500 for providing automated script review utilizing crowdsourced inputs in accordance with an embodiment is shown. In one or more embodiments of the present invention, the method 500 may be embodied in software that is executed by computer elements located within a network that may reside in the cloud, such as the cloud computing environment 50 described herein above and illustrated in FIGS. 1 and 2. In other embodiments of the invention, the computer elements may reside on a computer system or processing system, such as the processing system 300 or 400 described herein above and illustrated in FIGS. 3 and 4, or in some other type of computing or processing environment.

The method 500 begins at block 502 and includes receiving (e.g., via processing system 400) a new script comprising a script text and a script description.

At block 504, the method includes comparing (e.g., via processing system 400) the new script to each of a plurality of previously classified scripts to determine a degree of similarity. A previously classified script can be a script that has been previously reviewed and classified by a subject matter expert or a script that has been previously classified by the script acceptance model 410 of the processing system 400 and verified by a subject matter expert. According to some embodiments, the plurality of previously classified scripts can be stored in a memory (e.g., data store 422) associated with the processing system (e.g., processing system 400). In some embodiments of the invention, each of the plurality of previously classified scripts and the new script can have an associated set of attributes. According to some embodiments of the invention, each set of attributes can include an indication of an associated product of the respective script (i.e., a product that the script performs an action on), an indication of a type of action performed by the respective script, one or more parameters associated with the respective script, and/or the programming language the script is written in. According to some embodiments of the invention, such attributes can be user-input and stored in association with the script. Further, previously classified scripts may have an associated label that indicates whether the script was previously accepted or not.

According to some embodiments of the invention, comparing the new script to each of the plurality of previously classified scripts to determine a degree of similarity can include, for each of the plurality of previously classified scripts, comparing the set of attributes associated with the new script to the set of attributes associated with the previously classified script, generating a score representative of the degree of likeness for each compared pair of sets of attributes, and selecting a highest score representative of the degree of likeness as the degree of similarity. For example, a degree of likeness between the script text of each script may be calculated using, for example, a cosine similarity equation. Similarly, a degree of likeness between the script description of each script can also be calculated using a cosine similarity equation. The system can also make a binary non-binary (i.e., a degree of likeness) determination regarding whether the languages of each script, the associated product of each script, the type of action performed by each script and the parameters associated with each script match or to what degree they match. The comparison of each attribute may generate a score that can then be aggregated into an overall score that represents a degree of similarity between the new script and a given one of the plurality of previously classified scripts. Those of skill in the art will understand that various algorithms may be used to generate an overall score, for example, by applying different weights to different attribute comparison scores and determining an average weighted score of all compared attributes.

At block 506, the method includes mapping (e.g., via processing system 400) the new script to a crowdsourcing platform (e.g., crowdsourcing platform 430) to identify a similar script in response to determining that the degree of similarity is below a predetermined threshold. As previously described above, a crowdsourcing platform can be a website, such as a question and answer website that is configured to allow user to post a question and receive responses, comments and votes from other users. For example, in some embodiments of the invention, feature crowdsourcing engine 408 may cause crowdsourcing platform 430 to generate a new post seeking feedback on a new script or a function related to the new script. For example, in some embodiments of the invention, the crowdsourcing platform can post the script text of the new script and/or the script description of the new script with a request for feedback regarding whether the new script will adequately perform the function(s) described by the script description. In some embodiments of the invention, the feature crowdsourcing engine 408 may be configured to formulate a question based on the new script to be posted to a question and answer website. For example, if a script description of the new script is "Prepend a given rule to the iptables", feature crowdsourcing engine 408 may be configured to form a question out of the script description by prepending the phrase "How do I" to the script description to form a question that reads "How do I prepend a given rule to the iptables?" Alternatively, feature crowdsourcing engine may cause crowdsourcing platform 430 to post the script text of the new script with question generated based on the script text (e.g., "Will this script work well to prepend a given rule to the iptable?"). Once a question or new script text/description is posted, other users of the crowdsourcing platform 430 may submit comments, suggestions and votes associated with the new script and/or other suggested scripts posted on the page by other users. Thus, in some embodiments of the invention, mapping (e.g., via processing system 400) the new script to the crowdsourcing platform to identify a similar script can include posting a request for assistance in generating a script to achieve a goal of the new script on an electronic message board accessible by a plurality of users, receiving one or more responses to the request that each include a suggested script, and selecting a script of the one or more suggested scripts as the similar script. According to some embodiments, a suggested script that has the most upvotes, the most positive comments or the highest weighted combination of positive feedback may be selected as the similar script. In some embodiments of the invention, receiving one or more responses to the request may include receiving responses for at least a threshold period of time or receiving at least a threshold number of responses. For example, feature crowdsourcing engine 408 may wait for at least a predetermined duration of time (e.g., 3 days) to allow users to post responses, comments and votes, before collecting information from the page to utilize in determining features. Similarly, in some embodiments of the invention, feature crowdsourcing engine 408 may wait for at least a predetermined number of comments or votes to be made on the post before collecting information from the page to utilize in determining features.

The crowdsourcing platform 430 can include many different pages, with each page devoted to a different script topic. For example, each page may include a posted script description that describes the intended function of a script that is the topic of discussion of the page and/or a posted script text that provides example code that is expected to perform the described functions. In some embodiments, crowdsourcing platform 430 may be an electronic message board platform. In some embodiments of the invention, mapping the new script to the crowdsourcing platform to identity a similar script can involve identifying a previously posted script that matches or is similar to the new script. In other words, a script that matches or is very similar to the new script may have already previously been discussed/vetted on the crowdsourcing platform 430, and so in some embodiments mapping the new script to the crowdsourcing platform 430 may include comparing the new script to previously posted scripts and identifying a matching or very similar previously posted script for which user feedback has already been gathered. Thus, according to some embodiments of the invention, mapping the new script to the crowdsourcing platform to identify a similar script can include generating one or more similarity of description scores by comparing each of one or more posted script descriptions to the script description of the new script and selecting a similar script based on the one or more similarity of description scores. According to some embodiments of the invention, the similar script can be associated with a posted description that has an associated similarity of description score that exceeds a predetermined similarity threshold. In other words, the system may compare the descriptions of the new script to several descriptions of previously posted scripts and if the similarity between one or more pairs of descriptions exceeds a predetermined threshold, the system may select one of the corresponding previously posted script texts (e.g., the one with the highest similarity score) as the similar script. According to some embodiments of the invention, a previously posted script text may only be selected as a similar script if one or more attributes associated with each script matches. For example, if the new script and the previously posted script text are written in different languages, used on different devices, or perform different action types, then the previously posted script may not be selected as a similar script.

At block 508, the method includes receiving (e.g., via processing system 400) information indicative of one or more features from the crowdsourcing platform. For example information indicative of one or more features can include one or more of: a text of the similar script, a description of the similar script, a number of upvotes associated with the similar script, a number of downvotes associated with the similar script, a number of positive sentiments associated with the similar script, a number of neutral sentiments associated with the similar script, a number of negative sentiments associated with the similar script, and an indication of whether the similar script was previously accepted or rejected. According to some embodiments of the invention, the method may further include determining (e.g., via processing system 400) the one or more features based on the information indicative of one or more features. The one or more features can include one or more of: a level of similarity between descriptions of the new script and the similar script, a level of similarity between the script text of the new script and the text of the similar script, an indication of whether the similar script was previously accepted or rejected, a number of upvotes, a percentage of upvotes, a number of positive sentiments, a percentage of positive sentiments, number of comments associated with a psoted script and duration of time a page that the new script is mapped to has been available for other users to provide feedback. The determined features can serve as inputs to the script acceptance model 410.

At block 510, the method includes generating (e.g., via processing system 400) an acceptance recommendation associated with the new script in response to inputting the one or more features into an acceptance model. The acceptance recommendation associated with the new script can provide an indication of whether to accept or reject the new script. In some embodiments of the invention, the method may include automatically causing the new script to be implemented to electronically perform an action associated with the new script in response to determining the acceptance recommendation provides an indication to accept the new script. For example, if the script acceptance model 410 recommends accepting the new script, then processing system 400 may automatically execute the script by, for example, placing the script in the code pipeline for execution. In some embodiments of the invention, the script acceptance model 410 may output the recommendation to a user device 420 associated with a script reviewer that can further make a determination as to whether to accept or reject the script.

Figure 6:
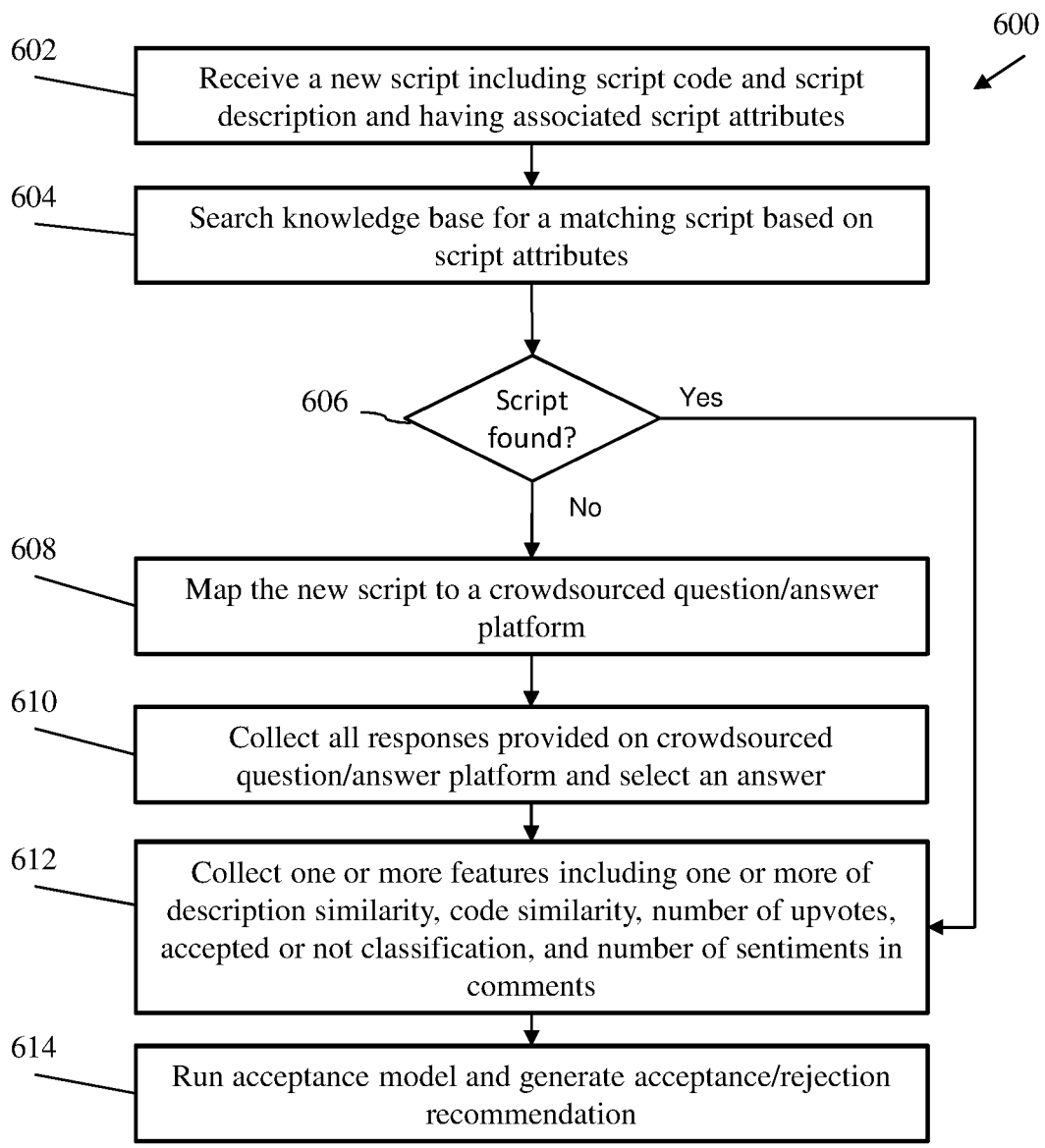
FIG. 6 depicts a flow diagram of another method for providing automated script review utilizing crowdsourced inputs according to one or more embodiments of the invention.

FIG. 6 depicts a flow diagram of a method 600 for providing automated script review utilizing crowdsourced inputs in accordance with an embodiment is shown. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments of the invention, the computer elements may reside on a computer system or processing system, such as the processing system 300 or 400 described herein above and illustrated in FIGS. 3 and 4, or in some other type of computing or processing environment.

The method 600 begins at block 602 and includes receiving a new script that includes a script code, a script description and has associated script attributes. At block 604, the method 600 includes searching a knowledge base (e.g., data store 422) for a matching script based on the script attributes. At block 606, the method 600 includes determining whether a matching script was found in the knowledge base. As described previously above, a matching script may be a script that has a degree of similarity above a predetermined threshold when compared with corresponding aspects of the new script (e.g., script text, description text, attributes, etc.). If no matching script is found, the method 600 proceeds to block 608, which includes mapping the new script to a crowdsourced question/answer platform as described previously above. If a matching script is found, the method 600 may proceed to block 612 described below.

At block 610, the method 600 includes collecting all responses provided on the crowdsourced question/answer platform and selecting an answer. For example, as described previously above, the responses may be collected upon the expiration of a predetermined duration of time or upon detected that at least a predetermined number of responses have been posted on the crowdsourcing platform in relation to the mapped new script. Selecting an answer may include selecting a suggested script (and associated script description and attributes) that has been posted as an answer to a question posed in association with the new script during the mapping process. In a case where there is more than one suggested script, the system may select the one with the highest number of upvotes or the highest average sentiment in the comments.

At block 612, the method 600 includes collecting one or more features that can include one or more of a description similarity, code similarity, number of upvotes, accepted or not classification, number and/or nature of sentiments in comments, and time of duration that a given new script has been posted on a question/answer site. The description similarity may be a degree of similarity between the script description of the new script and of the similar script. Likewise, the code similarity may be a degree of similarity between the script text of the new script and of the similar script.

At block 614, the method 600 includes running the acceptance model and generating an acceptance/rejection recommendation. For example, the script acceptance model 410 may receive a feature vector based on aspects of the new script and a matching or similar script as an input, and output an indication as to whether the new script should be accepted or not.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, a new script comprising a script text and a script description;

comparing, by the processor, the new script to each of a plurality of previously classified scripts to determine a degree of similarity, wherein each of the plurality of previously classified scripts and the new script have an associated set of attributes, wherein comparing the new script to each of the plurality of previously classified scripts to determine a degree of similarity comprises:
  for each of the plurality of previously classified scripts, comparing, by the processor, the set of attributes associated with the new script to the set of attributes associated with the previously classified script;
  generating, by the processor, for each compared pair of sets of attributes, a score representative of the degree of likeness; and
  selecting, by the processor, a highest score representative of the degree of likeness as the degree of similarity;
responsive to determining that the degree of similarity is below a predetermined threshold, mapping, by the processor, the new script to a crowdsourcing platform to identify a similar script, wherein mapping the new script to the crowdsourcing platform to identify a similar script comprises:
  automatically posting, by the processor, a request for assistance in generating a script to achieve a goal of the new script on an electronic message board accessible by a plurality of users, wherein the posting comprises generating a new webpage including the new script and a request for feedback;
  retrieving, by the processor and from the crowdsourcing platform, information indicative of one or more features, wherein the one or more features are selected based at least in part on the one or more features having a comments sentiment higher than a threshold sentiment; and
  responsive to inputting the one or more features into an acceptance model, generating, by the processor, an acceptance recommendation associated with the new script.

2. The computer-implemented method of claim 1, wherein each set of attributes comprises an indication of an associated product of the respective script, an indication of a type of action performed by the respective script, and one or more parameters associated with the respective script.

3. The computer-implemented method of claim 1, wherein mapping the new script to the crowdsourcing platform to identify a similar script comprises:
  generating, by the processor, one or more similarity of description scores by comparing each of one or more posted descriptions to the script description of the new script, wherein the one or more posted descriptions are posted on an electronic message board platform; and
  selecting, by the processor, the similar script based on the one or more similarity of description scores, wherein the similar script is associated with a posted description that has an associated similarity of description score that exceeds a predetermined similarity threshold.

4. The computer-implemented method of claim 1, wherein mapping the new script to the crowdsourcing platform to identify a similar script comprises:
  receiving, by the processor, one or more responses to the request, wherein each response comprises a suggested script; and
  selecting a script of the one or more suggested scripts as the similar script.

5. The computer-implemented method of claim 4, wherein receiving information indicative of one or more features comprises receiving one or more of: a text of the similar script, a description of the similar script, a number of upvotes associated with the similar script, a number of downvotes associated with the similar script, a number of positive sentiments associated with the similar script, a number of neutral sentiments associated with the similar script, a number of negative sentiments associated with the similar script, and an indication of whether the similar script was previously accepted or rejected.

6. The computer-implemented method of claim 5 further comprising determining the one or more features based on the information indicative of one or more features, wherein the one or more features comprise one or more of: a level of similarity between descriptions of the new script and the similar script, a level of similarity between the script text of the new script and the text of the similar script, an indication of whether the similar script was previously accepted or rejected, a number of up-votes, a percentage of up-votes, a number of positive sentiments and a percentage of positive sentiments.

7. The computer-implemented method of claim 4, wherein receiving one or more responses to the request comprising:
  receiving, by the processor, responses for at least a threshold period of time; or
  receiving, by the processor, at least a threshold number of responses.

8. The computer-implemented method of claim 1, wherein the acceptance recommendation associated with the new script provides an indication of whether to accept or reject the new script.

9. The computer-implemented method of claim 8 further comprising, responsive to determining the acceptance recommendation provides an indication to accept the new script, automatically causing, by the processor, the new script to be executed to electronically perform an action associated with the new script.

10. A system comprising:
  a processor communicatively coupled to a memory, the processor configured to:
    receive a new script comprising a script text and a script description;
    compare the new script to each of a plurality of previously classified scripts to determine a degree of similarity, wherein each of the plurality of previously classified scripts and the new script have an associated set of attributes, wherein comparing the new script to each of the plurality of previously classified scripts to determine a degree of similarity comprises:
      for each of the plurality of previously classified scripts, comparing the set of attributes associated with the new script to the set of attributes associated with the previously classified script;
      generating, for each compared pair of sets of attributes, a score representative of the degree of likeness; and
      selecting a highest score representative of the degree of likeness as the degree of similarity;
    responsive to determining that the degree of similarity is below a predetermined threshold, map the new script to a crowdsourcing platform to identify a similar script, wherein mapping the new script to the crowdsourcing platform to identify a similar script comprises:
      automatically posting, by the processor, a request for assistance in generating a script to achieve a goal of the new script on an electronic message board accessible by a plurality of users, wherein the posting comprises generating a new webpage including the new script and a request for feedback; r retrieve, from the crowdsourcing platform, information indicative of one or more features, wherein the one or more features are selected based at least in part on the one or more features having a comments sentiment higher than a threshold sentiment;

responsive to inputting the one or more features into an acceptance model, generate an acceptance recommendation associated with the new script.

11. The system of claim 10, wherein each set of attributes comprises an indication of an associated product of the respective script, an indication of a type of action performed by the respective script, and one or more parameters associated with the respective script.

12. The system of claim 10, wherein mapping the new script to the crowdsourcing platform to identify a similar script comprises:

generating one or more similarity of description scores by comparing each of one or more posted descriptions to the script description of the new script, wherein the one or more posted descriptions are posted on an electronic message board platform; and selecting the similar script based on the one or more similarity of description scores, wherein the similar script is associated with a posted description that has an associated similarity of description score that exceeds a predetermined similarity threshold.

13. The system of claim 10, wherein mapping the new script to the crowdsourcing platform to identify a similar script comprises:

receiving one or more responses to the request, wherein each response comprises a suggested script; and selecting a script of the one or more suggested scripts as the similar script.

14. The system of claim 13, wherein receiving one or more responses to the request comprising:

receiving responses for at least a threshold period of time; or receiving at least a threshold number of responses.

15. A computer program product comprising a computer readable storage medium having program instructions embodied therewith the program instructions executable by a computer processor to cause the computer processor to perform a method comprising:

receiving a new script comprising a script text and a script description;

comparing the new script to each of a plurality of previously classified scripts to determine a degree of similarity, wherein each of the plurality of previously classified scripts and the new script have an associated set of attributes, wherein comparing the new script to each of the plurality of previously classified scripts to determine a degree of similarity comprises:

for each of the plurality of previously classified scripts, comparing the set of attributes associated with the new script to the set of attributes associated with the previously classified script;

generating, for each compared pair of sets of attributes, a score representative of the degree of likeness; and selecting a highest score representative of the degree of likeness as the degree of similarity;

responsive to determining that the degree of similarity is below a predetermined threshold, mapping the new script to a crowdsourcing platform to identify a similar script, wherein mapping the new script to the crowdsourcing platform to identify a similar script comprises:

automatically posting, by the processor, a request for assistance in generating a script to achieve a goal of the new script on an electronic message board accessible by a plurality of users, wherein the posting comprises generating a new webpage including the new script and a request for feedback;

retrieving, from the crowdsourcing platform, information indicative of one or more features, wherein the one or more features are selected based at least in part on the one or more features having a comments sentiment higher than a threshold sentiment; responsive to inputting the one or more features into an acceptance model, generating an acceptance recommendation associated with the new script.

16. The computer program product of claim 15, wherein each set of attributes comprises an indication of an associated product of the respective script, an indication of a type of action performed by the respective script, and one or more parameters associated with the respective script.

17. The computer program product of claim 15, wherein mapping the new script to the crowdsourcing platform to identify a similar script comprises:

generating one or more similarity of description scores by comparing each of one or more posted descriptions to the script description of the new script, wherein the one or more posted descriptions are posted on an electronic message board platform; and selecting the similar script based on the one or more similarity of description scores, wherein the similar script is associated with a posted description that has an associated similarity of description score that exceeds a predetermined similarity threshold.

* * * * *